United States Patent
Kiyofuji et al.

(10) Patent No.: US 10,844,252 B2
(45) Date of Patent: Nov. 24, 2020

(54) LATEX COMPOSITION AND ONE-PACK TYPE AQUEOUS ADHESIVE COMPOSED OF SAID LATEX COMPOSITION

(71) Applicant: DENKA COMPANY LIMITED, Tokyo (JP)

(72) Inventors: Gaito Kiyofuji, Itoigawa (JP); Masao Onozuka, Itoigawa (JP); Manabu Mizushima, Itoigawa (JP); Shogo Hagiwara, Itoigawa (JP); Hironori Konishi, Ichihara (JP); Daisuke Shimiya, Ichihara (JP); Kazuhiro Kote, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 27 days.

(21) Appl. No.: 16/315,414

(22) PCT Filed: Jun. 29, 2017

(86) PCT No.: PCT/JP2017/023924
§ 371 (c)(1),
(2) Date: Jan. 4, 2019

(87) PCT Pub. No.: WO2018/008509
PCT Pub. Date: Jan. 11, 2018

(65) Prior Publication Data
US 2019/0309195 A1    Oct. 10, 2019

(30) Foreign Application Priority Data
Jul. 5, 2016 (JP) ................ 2016-133343

(51) Int. Cl.
| | | |
|---|---|---|
| C09J 111/02 | (2006.01) | |
| C09J 11/04 | (2006.01) | |
| C09J 11/06 | (2006.01) | |
| C08K 5/42 | (2006.01) | |
| C08K 5/17 | (2006.01) | |
| C08K 3/30 | (2006.01) | |
| C08K 3/38 | (2006.01) | |
| C09J 11/00 | (2006.01) | |
| C09J 133/00 | (2006.01) | |
| C08L 11/02 | (2006.01) | |
| C08L 33/08 | (2006.01) | |

(52) U.S. Cl.
CPC ............. *C09J 111/02* (2013.01); *C08K 3/30* (2013.01); *C08K 3/38* (2013.01); *C08K 5/17* (2013.01); *C08K 5/42* (2013.01); *C08L 11/02* (2013.01); *C08L 33/08* (2013.01); *C09J 11/00* (2013.01); *C09J 11/04* (2013.01); *C09J 11/06* (2013.01); *C09J 133/00* (2013.01)

(58) Field of Classification Search
CPC ............ C09J 111/02; C09J 11/06; C09J 11/04
See application file for complete search history.

(56) References Cited

U.S. PATENT DOCUMENTS

| | | | |
|---|---|---|---|
| 2012/0142859 A1 | 6/2012 | Kobayashi et al. | |
| 2012/0238678 A1* | 9/2012 | Minorikawa | ........... C08L 11/02 524/156 |
| 2015/0057399 A1 | 2/2015 | Ohnishi | |

FOREIGN PATENT DOCUMENTS

| | | |
|---|---|---|
| CN | 102212320 A | 10/2011 |
| CN | 102549021 A | 7/2012 |
| CN | 102666708 A | 9/2012 |
| CN | 104099038 A | 10/2014 |
| JP | S56-059874 A | 5/1981 |
| JP | S59-023334 B2 | 6/1984 |
| JP | H08-333485 A | 12/1996 |
| JP | H09-188860 A | 7/1997 |
| JP | H11-189982 A | 7/1999 |
| JP | 2004-059895 A | 2/2004 |
| JP | 2004-197028 A | 7/2004 |
| JP | 2006-083302 A | 3/2006 |
| JP | 2009-102465 A | 5/2009 |
| JP | WO2011/065524 A1 | 4/2013 |
| WO | 2016/133190 A1 | 8/2016 |

OTHER PUBLICATIONS

PCT/ISA/210, "International Search Report for International Application No. PCT/JP2017/023924," dated Sep. 19, 2017.
Europe Patent Office, "Search Report for European Patent Application No. 17824114.7," dated Jul. 10, 2019.
China Patent Office, "Office Action for Chinese Patent Application No. 201780041394.7," dated Sep. 4, 2020.

* cited by examiner

*Primary Examiner* — Hui H Chin
(74) *Attorney, Agent, or Firm* — Manabu Kanesaka

(57) ABSTRACT

A latex composition shows storage stability and spray coating characteristics and gives a soft adhesive layer after drying and a one-pack type aqueous adhesive. The latex composition includes a chloroprene-based polymer latex (A) containing a chloroprene-based polymer in an amount of 50 to 85 mass % as solid matter and an acrylic polymer latex (B) having a glass transition temperature of −52 to −9° C. and containing an acrylic polymer containing a sodium alkylbenzenesulfonate having a structure represented by the Chemical Formula (1) or a sodium alkyl diphenyl ether disulfonate in an amount of 15 to 50 mass % as solid matter, in a total amount of 100 parts by mass, and additionally at least one pH regulator (C) selected from boric acid, ammonium sulfate, and amino acids having an isoelectric point of 5.5 to 6.5 in an amount of 3 to 13 parts by mass as solid matter.

6 Claims, No Drawings

LATEX COMPOSITION AND ONE-PACK TYPE AQUEOUS ADHESIVE COMPOSED OF SAID LATEX COMPOSITION

RELATED APPLICATIONS

The present application is National Phase of International Application No. PCT/JP2017/023924 filed Jun. 29, 2017, and claims priority from Japanese Application No. 2016-133343, filed Jul. 5, 2016, the disclosure of which is hereby incorporated by reference herein in its entirety.

TECHNICAL FIELD

The present invention relates to a latex composition comprising at least a chloroprene-based polymer latex, an acrylic polymer latex and a pH adjuster and a one-pack type aqueous adhesive comprising the latex composition.

BACKGROUND ART

Common adhesives are produced using a vinyl acetate-based polymer, a chloroprene-based polymer, an acrylic ester-based polymer, a natural rubber, a urethane-based polymer, or the like as the raw material. Among the polymers above, chloroprene-based polymers have been used favorably in adhesive applications, for example, solvent-based contact adhesives and graft adhesives, as they give high adhesive strength to a wide variety of adherends under low application pressure.

However, regulations on volatile organic compounds (VOCs) and solvents are becoming severer year by year because of the concern on firing in working environment, the cost for installing special exhaust/recovery facility for prevention of the fire and also of the concern on environmental pollution and the health of people. In particular, regulations on adhesives for use in furniture such as sofas and beds, construction materials and car interior materials are significant.

For elimination of solvents to cope with the regulations above, aqueous adhesives employing a chloroprene-based polymer latex are intensively studied. However, furniture, construction materials, and car interior materials are often larger in size and complicated in shape and thus demand an increased number of steps for adhesion operation. Therefore, the adhesives are desired to be adhered in a very short period of time after application from the viewpoint of productivity. Aqueous adhesives, which show adhesive strength only after they are sufficiently dried and solidified, had a problem that they are lower in initial adhesive strength than conventional solvent-based adhesives.

Two-pack type adhesives have been studied as a technology for improving the initial adhesive strength above. Specifically, adhesives consisting of a main ingredient containing a particular polychloroprene latex, an acrylic or SBR-based latex, and an anionic surfactant in particular amounts and a hardening agent of a polyvalent metal salt are known (see Patent Documents 1 and 2).

In spray-coating these adhesives, methods of mixing the adhesive in advance, mixing it at the tip of the spraying machine, mixing it on the adherend (overlay coating, honeymoon), and the like are employed. However, there are still many troubles, as the pot life and the adhesive strength of the adhesives are not well balanced, the blending ratio of the adhesives is not consistent, the adhesion operation is not stabilized, and there are spray clogging.

To overcome the problems of the two-pack type adhesives above, a one-pack type adhesive containing a polychloroprene latex and a pH adjuster, such as the one described in Patent Document 3, was studied. The one-pack type adhesive, which contains a chloroprene latex and additionally a pH adjuster, shows superior initial adhesive strength. One-pack type adhesives also do not cause the problems, for example, that the pot life and the initial adhesive strength are not well balanced during coating and that the blending ratio of the adhesive is not consistent. As polychloroprenes have high crystallinity, they are well known as adhesives superior in initial adhesive strength, contact property, storage stability, and spray coating characteristics.

However, although polychloroprene's high crystallinity leads to favorable initial adhesive strength, the adhesive layer thereof has a tendency to harden gradually. For example when a foam such as a furniture (sofa, bed), a construction material, or an automobile interior product and a soft material such as wood, leather or foam are bonded to each other, there existed a problem that the adhesive layer becomes harder than the adherends, thus impairing the texture of the adhered product.

CITATION LIST

Patent Document

Patent Document 1: JP-A No. S56-59874
Patent Document 2: JP-A No. H9-188860
Patent Document 3: Japanese Patent Application No. H11-189982

SUMMARY OF THE INVENTION

Technical Problem

Although one-pack type adhesives have the problems described above, those that are well-balanced between the initial adhesive strength after an extremely short drying period and the softness of adhesive layer after drying and also superior in storage stability and spray coating characteristics are still not provided.

Accordingly, the present invention provides a latex composition favorable in the application of one-pack type aqueous adhesives that shows superior initial adhesive strength after an extremely short of time, are superior in storage stability and give a soft adhesive layer after drying and a one-pack type aqueous adhesive comprising the latex composition.

Solution to Problem

After intensive studies to solve the problems above, the inventors have found that it is possible to solve the problems above by making a chloroprene-based polymer latex contain a latex (emulsion) of a particular acrylic polymer and a particular pH regulator.

Specifically, the present invention provides first a latex composition, comprising a chloroprene-based polymer latex (A) containing a chloroprene-based polymer in an amount of 50 to 85 mass % as solid matter and an acrylic polymer latex (B) having a glass transition temperature of −52 to −9° C. and containing an acrylic polymer containing a sodium alkylbenzenesulfonate having a structure represented by the following Chemical Formula (1) or a sodium alkyl diphenyl ether disulfonate in an amount of 15 to 50 mass % as solid matter in a total amount of 100 parts by mass and additionally, at least one pH regulator (C) selected from boric acid, ammonium sulfate, and amino acids having an isoelectric point of 5.5 to 6.5 in an amount of 3 to 13 parts by mass as solid matter:

[Formula 1]

(1)

The sodium alkylbenzenesulfonate having a structure represented by the Chemical Formula (1) used in the latex composition according to the present invention may be sodium dodecylbenzenesulfonate.

The content of the sodium alkylbenzenesulfonate having a structure represented by the Chemical Formula (1) or the sodium alkyl diphenyl ether disulfonate in the latex composition according to the present invention may be 1.5 to 5 parts by mass with respect to 100 parts by mass of the acrylic polymer.

The chloroprene-based polymer used in the latex composition according to the present invention may be a chloroprene homopolymer, a copolymer of chloroprene and 2,3-dichloro-1,3-butadiene or a mixture of a chloroprene homopolymer and a copolymer of chloroprene and 2,3-dichloro-1,3-butadiene.

The chloroprene-based polymer latex (A) used in the latex composition according to the present invention is preferably a chloroprene-based polymer latex having a gel content (toluene insoluble fraction) of 5 to 30 mass % or less, the toluene soluble fraction having a number-average molecular weight of 200,000 to 500,000 and a molecular weight distribution (Mw/Mn) of 2.0 to 4.0.

The latex composition according to the present invention can be used as a one-pack type aqueous adhesive.

Advantageous Effects of Invention

The latex composition according to the present invention is superior in initial adhesive strength. It also gives a soft adhesive layer after drying. It is also superior in the balance of storage stability and spray coating characteristics.

DESCRIPTION OF EMBODIMENTS

Hereinafter, favorable embodiments of the present invention will be described. It should be understood that the embodiments described below are only typical embodiments of the present invention and the scope of the present invention shall not be limited thereby.

The latex composition in the present embodiment is characterized in that it comprises a chloroprene-based polymer latex (A), a particular acrylic polymer latex (B), and a particular pH regulator (C) at a particular rate.

Chloroprene-Based Polymer Latex (A)

The chloroprene-based polymer latex is blended for improvement in contact property, heat-resistant adhesiveness, and initial adhesive strength of the adhesive comprising a latex composition of the present embodiment. The chloroprene-based polymer latex is desirably one in which the gel content (toluene insoluble fraction) of the chloroprene-based polymer constituting the chloroprene-based polymer latex is 5 to 30 mass % and the toluene soluble fraction in the chloroprene-based polymer has a number-average molecular weight in the range of 200,000 to 500,000 and a molecular weight distribution (Mw/Mn) in the range of 2.0 to 4.0. It is possible to improve the initial adhesive strength, when the gel content is 5 mass % or more and the toluene soluble fraction has a number-average molecular weight of 200,000 or more and a molecular weight distribution of 2.0 or more. It is possible to improve the initial adhesive strength when the gel content is 30 mass % or less and the toluene soluble fraction has a number-average molecular weight of 500,000 or less, and a molecular weight distribution of 4.0 or less.

The chloroprene-based polymer latex can be converted to any latex, anionic, nonionic, or cationic, by properly selecting an emulsifier and a dispersant used for emulsion polymerization of monomers. For use as a raw material for adhesives, it is preferably an anionic latex from the viewpoint of initial adhesive strength. The anionic latex is a latex prepared in emulsion polymerization of monomers, as an anionic emulsifier or dispersant is mainly used.

Examples of the anionic emulsifiers and dispersants include rosin acid alkali-metal salts, alkyl sulfonates and alkyl aryl sulfates having a carbon number of 8 to 20, condensates of sodium naphthalenesulfonate and formaldehyde, and sodium alkyl diphenyl ether disulfonates.

The anionic emulsifier and dispersant are most preferably rosin acids. Any one of wood rosin acids, gum rosin acids, tall oil rosin acids, or disproportionated rosin acids obtained by disproportionation of these rosin acids can be used. As emulsifier polymerization using a rosin acid is carried out under higher alkalinity, the rosin acid is present in the polychloroprene latex in the shape of alkali metal salt. Thus, the rosin acid can be used in the shape of a rosin acid alkali metal salt. The addition amount of the rosin acid is preferably 0.5 to 10 parts by mass, more preferably 2 to 6 parts by mass, with respect to 100 parts by mass of the total monomers used. It is possible, when it is added in an amount of 0.5 part or more by mass, to prevent insufficient emulsification and deterioration in regulation of the polymerization heat generated and to reduce the problems such as generation of aggregates and deterioration of product appearance. It is possible, when it is added in an amount of 10 parts or less by mass, to prevent presence of residual emulsifier and improve water resistance of the polymer, thus improving adhesive strength, and to reduce the problems such as foaming during drying and deterioration in color tone of the product.

When a rosin acid is used, it is preferable to use an anionic emulsifier or dispersant, such as a sulfate salt- or sulfonate salt-based emulsifier or dispersant, for stabilization of the chloroprene-based polymer latex composition after addition of the pH regulator. In such a case, the addition amount of the anionic emulsifier or dispersant other than rosin acid is preferably 0.05 to 5 parts by mass, more preferably 0.1 to 2 parts by mass, with respect to 100 parts by mass of the total monomers used.

An anionic emulsifier or dispersant and a nonionic emulsifier or dispersant may be used in combination. It is possible by using a nonionic emulsifier in combination to improve the low temperature stability of the latex and the adhesive characteristics of the adhesive when produced. When a nonionic or cationic emulsifier or dispersant is used as the emulsifier or the dispersant during emulsion polymerization, it is possible to make the aqueous adhesive that is prepared by addition of a pH regulator sufficiently instabilized and thus to improve expression of its initial adhesive strength.

The chloroprene-based polymer constituting the chloroprene-based polymer latex may be a chloroprene homopolymer, but it may also be a chloroprene copolymer of chloroprene and other copolymerizable monomers such as 2,3-dichloro-1,3-butadiene, 1-chloro-1,3-butadiene, butadiene, isoprene, styrene, acrylonitrile, acrylic acid and esters, and methacrylic acid and esters in the range that does not impair the properties desired by the present invention. Specifically, copolymers containing 2,3-dichloro-1,3-butadiene, 1-chloro-1,3-butadiene, butadiene, isoprene, styrene, acrylonitrile, an acrylic ester, or a methacrylic ester in the range of 0.01 to 20 mass % and those containing acrylic acid or methacrylic acid in the range of 0.01 to 7 mass % can be used. Two or more monomers may be used, as needed, as the monomers constituting the copolymer. Alternatively, two or more polymers may be used as mixed. In particular, a chloroprene homopolymer, a copolymer of chloroprene and 2,3-dichloro-1,3-butadiene, or a mixture of a chloroprene homopolymer and a copolymer of chloroprene and 2,3-dichloro-1,3-butadiene is preferably used as the chloroprene-based polymer constituting the chloroprene-based polymer latex. It is possible, by using a chloroprene homopolymer, a copolymer of chloroprene and 2,3-dichloro-1,3-butadiene, or a mixture of a chloroprene homopolymer and a copolymer of chloroprene and 2,3-dichloro-1,3-butadiene, to improve the initial adhesive strength and the contact property of the adhesive and make the adhesive show high adhesive strength.

Examples of the chain-transfer agents used for adjustment of molecular weight and molecular weight distribution include, but are not limited to, long-chain alkylmercaptans such as n-dodecylmercaptan and t-dodecylmercaptan and dialkylxanthogen disulfides such as diisopropylxanthogen disulfide and diethylxanthogen disulfide. In particular, long-chain alkylmercaptans are more preferable for easier regulation of molecular weight and gel content. These chain-transfer agents may be used in combination of two or more.

The polymerization conversion rate of the raw monomers to the chloroprene-based polymer in the chloroprene-based polymer latex is not fundamentally limited, but is preferably 65 mass % or more and less than 90 mass %. The solid matter content of the polymer latex increases when the polymerization conversion rate is 65% or more, and it is thus possible to reduce the load in the drying step after coating of adhesive and make the adhesive layer uniformized. It is also possible to prevent generation of odor by residual monomers and, by reduction in the amount of the residual monomers, to improve the tackiness and the adhesive strength. It is possible, when the polymerization conversion rate is less than 90 mass %, to prevent increase of branching in the polymer, increase of molecular weight and expansion of molecular weight distribution, thus improving contact property and water resistance, important properties in the present invention. When a polymer having a conversion rate of 90 mass % or more, it is preferably used as an auxiliary component for a polymer having a conversion rate of less than 90 mass %. The polymerization conversion rate (mass %) is calculated by the following formula:

[(Mass of polymer/Total mass of monomers)×100].

The chloroprene-based polymer may be polymerized at a temperature in the range of 5 to 45° C., but is particularly preferably polymerized at a low temperature of 5 to 20° C. Normally, the chloroprene-based polymer obtained is known to contain trans-1,4 bonds at a rate of 85% or more and is thus relatively rich in regularity of the molecular structure. Because of the high regularity of the molecular structure, the chloroprene polymer shows typical properties as a crystalline polymer. In particular, polymerization at low temperature of 5 to 20° C. leads to further increase of the trans-1,4 bond rate in the polychloroprene molecule, which in turn leads to increase of the crystallization rate and sufficiently high adhesive strength when it is converted to an aqueous adhesive. From the viewpoint for acceleration of the crystallization rate, if a non-chloroprene monomer, which may disturb the regularity of molecular structure, is used in combination, it is preferably used in an amount as small as possible in the range that does not impair the adhesive strength.

Common radical polymerization initiators can be used as the polymerization initiators. Examples thereof favorably used in the case of emulsion polymerization include common organic or inorganic peroxides such as benzoyl peroxide, potassium persulfate, and ammonium persulfate and azo compounds such as azobisisobutylonitrile. A promotor such as an anthraquinonesulfonate salt, potassium sulfite, or sodium sulfite may also be used in combination, as needed.

Generally in production of chloroprene-based polymers, a polymerization terminator is added to stop the reaction when the polymerization rate reaches a particular point for production of a polymer having a desired molecular weight and distribution. The terminator is not particularly limited, and typical examples thereof favorably used include phenothiazine, p-t-butylcatechol, hydroquinone, hydroquinone monomethylether, and diethylhydroxylamine.

The solid matter concentration of the chloroprene-based polymer emulsion in the chloroprene-based polymer latex is not particularly limited, but is normally 40 to 65 mass %.

The rate of the chloroprene-based polymer latex in the entire latex mixture is preferably 50 to 85 mass %, more preferably 65 to 75 mass %, as solid matter. When it is less than 50 mass %, the resulting adhesive shows lower initial adhesive strength. Alternatively when it is more than 85 mass %, the resulting adhesive layer shows less soft texture, indicating no synergic effect of employing an acrylic polymer latex described below.

Chloroprene-based polymers are generally susceptible to degradation by oxygen. In the present invention, it is desirable to use a stabilizer such as antioxidant or acid acceptor in the range that does not impair the advantageous effects of the invention.

It is possible, by blending an acid acceptor in an amount of 0.01 to 5 mass % and an antioxidant in an amount of 0.1 to 3 mass % with respect to the chloroprene-based polymer, to obtain a composition that gives a post-crosslinking film that is improved in the stability of softness over time. When there are materials that are insoluble in water or that instabilize colloidal state of the polymer latex in the raw materials to the chloroprene-based polymer latex, an aqueous dispersion thereof is prepared and then added to the polymer latex.

The acid acceptor blended into the chloroprene-based polymer latex is not particularly limited, and typical examples thereof include zinc oxide and hydrotalcite (such as DHT-4A and DHT-6 manufactured by Kyowa Chemical Industry Co., Ltd.). They may be used in combination of two or more. The amount of these acid acceptors added is preferably 0.01 to 5 mass %, more preferably 0.05 to 1 mass %, with respect to the solid matter (chloroprene-based polymer) in the chloroprene-based polymer latex. It is possible, when it is 0.01 mass % or more, to neutralize the free hydrochloric acid generated from the polymer after it is used as an adhesive composition. Alternatively when it is 5 mass % or less, it is possible to improve tackiness, adhesive strength and also colloid stability of the polymer latex composition and to reduce problems such as sedimentation.

Acrylic Polymer Latex (B)

The acrylic polymer latex used in the latex composition of the present embodiment is blended for preservation of the initial adhesive strength of the adhesive when prepared and adjustment of the storage stability of the adhesive and the texture (hardness) of the resulting adhesive layer. For balance among the initial adhesive strength, storage stability, and texture (hardness) of the adhesive layer described above, an acrylic polymer latex having a glass transition temperature of −52° C. to −9° C. and containing a sodium sulfonate having a structure represented by the Chemical Formula (1) above or a sodium alkyl diphenyl ether disulfonate is used. The acrylic polymer latex more preferably has a glass transition point of −44 to −21° C. When the glass transition temperature is higher than −9° C., the resulting adhesive become less soft and when it is lower than −52° C., it shows insufficient initial adhesive strength. Alternatively when the structure represented by the Chemical Formula (1) or a sodium alkyl diphenyl ether disulfonate is not present, the resulting adhesive shows insufficient initial adhesive strength and has impaired storage stability.

The sodium alkylbenzenesulfonate having a structure represented by the Chemical Formula (1) to be used is more preferably sodium dodecylbenzenesulfonate.

The alkylbenzenesulfonic acid having a structure represented by the Chemical Formula (1) or the sodium alkyl diphenyl ether disulfonate is preferably contained in an amount of 1.5 to 5 parts by mass, more preferably 2 to 4 parts, with respect to 100 parts by mass of the acrylic copolymer. It is possible when the content is 1.5 parts or more by mass to improve colloid stability and consequently to improve storage stability. Alternatively when the content is 5 parts or less by mass, it is possible to improve initial adhesive strength.

These acrylic polymer latexes are those prepared by (co)polymerizing a (meth)acrylic ester, as needed, with a functional group monomer, a normal-temperature-crosslinking group monomer and/or other copolymerizable monomers.

Examples of the (meth)acrylic esters include methyl (meth)acrylate, ethyl (meth)acrylate, n-butyl (meth)acrylate, 2-ethylhexyl (meth)acrylate, glycidyl (meth)acrylate, propyl (meth)acrylate, stearyl (meth)acrylate, and benzyl (meth) acrylate. These (meth)acrylic esters may be used alone or as a mixture of two or more.

Examples of the functional group monomers include (meth)acrylic acid, maleic acid, itaconic acid, 2-hydroxyethyl (meth)acrylate, dimethylaminoethyl methacrylate, 1,6-hexanediol acrylate, and allyl methacrylate and these monomers may be used alone or as a mixture of two or more.

Examples of the normal-temperature-crosslinking group monomers include hydrazine derivatives such as adipic dihydrazide, glutaric dihydrazide, isophthalic dihydrazide, oxalic dihydrazide, malonic dihydrazide, succinic dihydrazide, sebacic dihydrazide, maleic dihydrazide, fumaric dihydrazide, itaconic dihydrazide, ethylene-1,2-dihydrazine, propylene-1,3-dihydrazine, and butylene-1,4-dihydrazide; ethylene glycol di(meth)acrylate, diethylene glycol di(meth) acrylate, triethylene glycol di(meth)acrylate, polyethylene glycol dimethacrylate, ethoxylated bisphenol A di(meth) acrylate, tridecanedimethanol di(meth)acrylate, 1,6 hexanediol di(meth)acrylate, 1,9 nonanediol di(meth)acrylate, neopentylglycol di(meth)acrylate, glycerol di(meth)acrylate, and trimethylolpropane tri(meth)acrylate, and these monomers may be used alone or as a mixture of two or more.

Examples of the other copolymerizable monomers include (meth)acrylonitrile, styrene, vinyl acetate, and allyl alcohol. These monomers may be used alone or as a mixture of two or more.

The preparative method for the acrylic polymer latex is not particularly limited, and it can be prepared by any known method such as emulsion polymerization method, suspension polymerization method, or emulsification dispersion method. Polymer particles are prepared by polymerization of these monomers above, and additives such as a polymerization initiator and a molecular weight adjuster can be used for preparation of the acrylic polymer latex of the present embodiment.

Examples of the polymerization initiators include organic peroxides such as lauroyl peroxide, diisopropyl peroxydicarbonate, di-2-ethylhexyl peroxydicarbonate, t-butyl peroxypivalate, and 3,3,5-trimethylhexanoyl peroxide; azo compounds such as α,α'-azobisisobutylonitrile, ammonium persulfate, and potassium persulfate. The polymerization initiators may be used alone or in combination of two or more.

Particularly by emulsion polymerization among the polymerization methods above, it is possible to produce easily the acrylic polymer latex for use in the present embodiment. It may alternatively be prepared in emulsion polymerization by emulsion-dropping method of mixing and dispersing monomers, water, and emulsifiers in advance and adding the dispersion during polymerization.

The acrylic polymer latex is preferably adjusted to a pH in the range of 5 to 10 from the viewpoints of colloid stability and others. pH may be adjusted by addition of an aqueous alkali solution containing ammonia, an alkali metal hydroxide or the like as dissolved. Examples of the alkali metal hydroxides include sodium hydroxide, potassium hydroxide, and potassium carbonate.

The glass transition point of the acrylic polymer latex is a value determined by using a differential scanning calorimeter (DCS) manufactured by Rigaku Denki Co., Ltd. under the following conditions:

1. Approximately 5 g (as solid matter) of an acrylic latex is applied thinly on a glass plate and dried thereon at 25° C. for 7 days, to give a polymer film.

2. The glass transition point of the dry film obtained is determined. Specifically, the amount of the sample is 20 mg and measurement is carried out at a heating rate of 20° C./minute under nitrogen environment.

The solid matter concentration of the acrylic polymer latex is not particularly limited, but normally 35 to 65 mass %.

The content of the acrylic polymer latex in the entire chloroprene-based polymer latex composition according to the present invention is preferably 15 to 50 mass %, more preferably 25 to 35 mass %, as solid matter. The adhesive layer does not show soft texture when the content is less than 15 mass % and the adhesive layer shows extremely low initial adhesive strength when it is more than 50 mass %.

pH Regulator (C)

A pH regulator is blended for improvement of the initial adhesive strength of the composition. The pH regulator possibly used is a weak acid or a buffer solution and specifically, at least one compound selected from boric acid, ammonium sulfate, and amino acids having an isoelectric point of 5.5 to 6.5 is used. Typical examples of the amino acids having an isoelectric point of 5.5 to 6.5 include glycine (isoelectric point: 5.97), alanine (isoelectric point: 6.00), threonine (isoelectric point: 6.16), and proline (isoelectric point: 6.30). Use of glycine, an amino acid, is preferable from the points of cost, adhesiveness, easiness in handling, and others.

It is preferable to use a 5%-concentration aqueous solution when boric acid is used as the pH regulator and to use a 2%-concentration aqueous solution when ammonium sulfate is used, as it is easier to handle such a solution. Alternatively when glycine is used as the pH regulator it is preferably used in an amount of 3 to 13 parts by mass, more preferably 5 to 11 parts by mass, with respect to 100 parts by mass (as solid matter) of the latex mixture of chloroprene-based polymer latex and acrylic polymer latex. When the addition amount of glycine is 3 parts or more by mass, it is possible to obtain an adhesive showing sufficiently high adhesive strength. It is possible, when the addition amount is 13 parts or less by mass, to prevent generation of aggregates during addition, improving the storage stability of the resulting adhesive.

The dry sheet obtained by drying a latex composition containing the components (A), (B), and (C) described above has a durometer hardness (type A), as specified in JIS K 6253-3, in the range of 75 or less. The adhesive layer is not soft when the durometer hardness is larger than 75.

In addition to the components (A), (B), and (C) described above, a plasticizer (D) represented by the following Chemical Formula (2) may be added, as needed, to the latex composition of the present embodiment in an amount of 1 to 20 parts by mass.

[Formula 2]

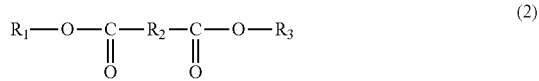

(2)

(wherein, $R_1$ and $R_3$ are each an aliphatic alkyl group having 1 to 3 carbon atoms or a hydrogen atom and $R_1$ and $R_3$ may have the same structure or different structures. $R_2$ represents an aliphatic alkyl group having 5 to 20 carbon atoms.) It is possible by adding the plasticizer described above to make the texture of the adhesive layer softer and keep the adhesive strength retained even when the drying period is elongated.

The addition amount of the plasticizer represented by the Chemical Formula (2) above is preferably in the range of 1 to 20 parts by mass, more preferably 2 to 15 parts by mass, still more preferably 5 to 10 parts by mass with respect to 100 parts by mass (solid matter) of the latex chloroprene-based polymer composition. If the addition amount of the plasticizer is small, the adhesive strength may decline when the drying period is elongated. Alternatively when the addition amount of the plasticizer is large, the initial adhesive strength may decline and the production thereof may become disadvantageous from the point of cost.

It is also preferable to add a hindered phenol-based antioxidant (E) to the latex composition according to the present invention. When the latex composition is converted to an adhesive, such a hindered phenol-based antioxidant has an action to prevent discoloration of the area of the adhesive excessively applied (glue line) and to improve hygienic property thereof. Examples of the hindered phenol-based antioxidants include 2,2'-methylenebis(4-ethyl-6-tert-butylphenol), 2,2'-methylenebis(4-methyl-6-tert-butylphenol), 4,4'-butylidenebis(3-methyl-6-tert-butylphenol), and butylated reaction products of p-cresol and dicyclopentadiene. The addition amount of the hindered phenol-based antioxidant is preferably 0.1 to 3 mass %, more preferably, 0.5 to 2 mass %, with respect to 100 parts by mass of the solid matter content of the latex composition. When the addition amount of the antioxidant is 0.1 mass % or more, it is possible to make anti-oxidative action expressed sufficiently. It is possible, when it is 3 mass % or less, to improve tackiness and adhesive strength.

Fillers, tackifiers, pigments, colorants, wetting agents, antifoams, thickeners, and others may be added, as needed, as other additives to the latex composition according to the present invention in the range that does not impair the advantageous effects of the present invention. Other resin emulsions (latexes) may also be added auxiliary in an amount of as high as 10 mass % (as solid matter) of the entire composition. Typical examples of the resin emulsions include resin emulsions of (modified) vinyl acetates, mixed vinyl acetate-acrylics, mixed acrylic-styrenes, and urethanes.

The production method for the latex composition according to the present invention is not particularly limited. Normally as for the order of blending, an acrylic polymer latex (B) is first added to a chloroprene-based polymer latex (A) and then a latex (C) is added to the composition. Depending on the components of the latex, aggregates or coagulums may be generated when a chloroprene-based polymer latex (A) and an acrylic polymer latex (B) are blended. In such a case, it is possible to obtain a latex composition without nonconformity, by first adding a pH adjuster (C) to a chloroprene-based polymer latex (A) and finally blending an acrylic polymer latex (B) thereto in that order. It is preferable to add each auxiliary component as an aqueous dispersion.

The latex composition thus obtained is very superior in initial adhesive strength. For example, the product adhesive layer has a sufficiently high adhesive strength even after an extremely short drying period of 10 seconds after application. The adhesive layer obtained after drying is soft and the durometer hardness (type A), as specified in JIS K 6253-3, of the dry sheet obtained after drying the latex composition is in the range of 75 or less. It is also superior in the balance of storage stability and spray coating characteristics. Because of the characteristics described above, the latex composition of the present embodiment can be used, as it is, as a one-pack type aqueous adhesive.

Examples of the adherends to which the one-pack type aqueous adhesive according to the present invention is favorably adhered include foams of materials such as polyurethane, ethylene-vinyl acetate copolymers, and polyethylene, and water-absorbing adherends such as woods, clothes and woven fabrics. Specifically, the adhesive is used for adhesion of foams including furniture such as sofas, beds, and chairs; construction materials, toys such as stuffed animals, and automobile interior products with woods, leathers, or foams.

The polymer latex composition prepared under the conditions described above, which gives a soft adhesive layer, can be used as a one-pack type aqueous adhesive that has excellent initial adhesive strength, contact property, water resistance, spray coating characteristics, and storage stability.

Examples

Hereinafter, the present invention will be described more specifically with reference to Examples. The Examples described below are only typical examples of the present invention and it should be understood that the present invention shall not be limited thereby. Parts and % in the following Examples are those by mass standard, unless specified otherwise.

[Preparation of Chloroprene-Based Polymer Latex]

(1) Preparation of Polychloroprene Latex A 100 parts by mass (hereinafter, referred to only as "parts") of pure water, 5 parts of rosin acid sodium, 0.5 part of potassium hydroxide, 0.3 part of formaldehyde naphthalenesulfonic acid condensate sodium salt, and 0.3 part of sodium hydrogen sulfite were placed in a reactor having a capacity of 3 liters under nitrogen stream. After solubilization, 100 parts of chloroprene monomer and 0.06 part of n-dodecylmercaptan were added to the mixture, as the mixture was agitated. The mixture was polymerized, using 0.1 wt part of potassium persulfate as the initiator at 10° C. under nitrogen environment and an emulsion of phenothiazine was added thereto for termination of polymerization when the final polymerization rate reached 65%. After unreacted monomers were removed under reduced pressure, a low-temperature stabilizer, a polyoxyalkylene alkyl ether, was added in an amount of 0.3 part with respect to 100 parts of the solid matter, as the mixture was agitated. Further, water was removed by vaporization under reduced pressure and the mixture was concentrated to a solid matter concentration of 55 mass %, to give a polychloroprene latex A (gel content: 0%, Mn of toluene soluble fraction: 300,000, molecular weight distribution (Mw/Mn): 2.5).

(2) Preparation of Polychloroprene Latex B 100 parts of pure water, 5 parts of rosin acid sodium, 0.5 part of potassium hydroxide, 0.3 part of formaldehyde naphthalenesulfonic acid condensate sodium salt, and 0.3 part of sodium hydrogen sulfite were placed in a reactor having a capacity of 3 liters under nitrogen stream. After solubilization, 100 parts of chloroprene monomer and 0.06 part of n-dodecylmercaptan were added to the mixture as it was agitated. The mixture was polymerized, using 0.1 wt part of potassium persulfate as the initiator at 10° C. under nitrogen environment and an emulsion of phenothiazine was added thereto for termination of polymerization when the final polymerization rate reached 70%. After unreacted monomers were removed under reduced pressure, a low-temperature stabilizer, a polyoxyalkylene alkyl ether, was added in an amount of 0.3 part with respect to 100 parts of the solid matter, as the mixture was agitated. Further, water was removed by vaporization under reduced pressure and the mixture was concentrated to a solid matter concentration of 55 mass %, to give a polychloroprene latex B (gel content: 5%, Mn of toluene soluble fraction: 300,000, molecular weight distribution (Mw/Mn): 2.5).

(3) Preparation of Polychloroprene Latex C 100 parts of pure water, 5 parts of rosin acid sodium, 0.5 part of potassium hydroxide, 0.3 part of formaldehyde naphthalenesulfonic acid condensate sodium salt, and 0.3 part of sodium hydrogen sulfite were placed in a reactor having a capacity of 3 liters under nitrogen stream. After solubilization, 100 parts of chloroprene monomer and 0.06 part of n-dodecylmercaptan were added to the mixture as it was agitated. The mixture was polymerized, using 0.1 wt part of potassium persulfate as the initiator at 10° C. under nitrogen environment and an emulsion of phenothiazine was added thereto for termination of polymerization when the final polymerization rate reached 85%. After unreacted monomers were removed under reduced pressure, a low-temperature stabilizer, a polyoxyalkylene alkyl ether, was added in an amount of 0.3 part with respect to 100 parts of the solid matter, as the mixture was agitated. Further, water was removed by vaporization under reduced pressure and the mixture was concentrated to a solid matter concentration of 55 mass %, to give a polychloroprene latex C (gel content: 30%, Mn of toluene soluble fraction: 300,000, molecular weight distribution (Mw/Mn): 2.5).

(4) Preparation of Polychloroprene Latex D 100 parts of pure water, 5 parts of rosin acid sodium, 0.5 part of potassium hydroxide, 0.3 part of formaldehyde naphthalenesulfonic acid condensate sodium salt, and 0.3 part of sodium hydrogen sulfite were placed in a reactor having a capacity of 3 liters under nitrogen stream. After solubilization, 100 parts of chloroprene monomer and 0.06 part of n-dodecylmercaptan were added to the mixture as it was agitated. The mixture was polymerized, using 0.1 wt part of potassium persulfate as the initiator at 10° C. under nitrogen environment and an emulsion of phenothiazine was added thereto for termination of polymerization when the final polymerization rate reached 90%. After unreacted monomers were removed under reduced pressure, a low-temperature stabilizer, a polyoxyalkylene alkyl ether, was added in an amount of 0.3 part with respect to 100 parts of the solid matter, as the mixture was agitated. Further, water was removed by vaporization under reduced pressure and the mixture was concentrated to a solid matter concentration of 55 mass %, to give a polychloroprene latex D (gel content: 40%, Mn of toluene soluble fraction: 300,000, molecular weight distribution (Mw/Mn): 2.5).

(5) Preparation of Polychloroprene Latex E 100 parts of pure water, 5 parts of rosin acid sodium, 0.5 part of potassium hydroxide, 0.3 part of formaldehyde naphthalenesulfonic acid condensate sodium salt, and 0.3 part of sodium hydrogen sulfite were placed in a reactor having a capacity of 3 liters under nitrogen stream. After solubilization, 100 parts of chloroprene monomer and 0.14 part of n-dodecylmercaptan were added to the mixture as it was agitated. The mixture was polymerized, using 0.1 wt part of potassium persulfate as the initiator at 10° C. under nitrogen environment and an emulsion of phenothiazine was added thereto for termination of polymerization when the final polymerization rate reached 80%. After unreacted monomers were removed under reduced pressure, a low-temperature stabilizer, a polyoxyalkylene alkyl ether, was added in an amount of 0.3 part with respect to 100 parts of the solid matter, as the mixture was agitated. Further, water was removed by vaporization under reduced pressure and the mixture was concentrated to a solid matter concentration of 55 mass %, to give a polychloroprene latex E (gel content: 15%, Mn of toluene soluble fraction: 100,000, molecular weight distribution (Mw/Mn): 2.5).

(6) Preparation of Polychloroprene Latex F 100 parts of pure water, 5 parts of rosin acid sodium, 0.5 part of potassium hydroxide, 0.3 part of formaldehyde naphthalenesulfonic acid condensate sodium salt, and 0.3 part of sodium hydrogen sulfite were placed in a reactor having a capacity of 3 liters under nitrogen stream. After solubilization, 100 parts of chloroprene monomer and 0.10 part of n-dodecylmercaptan were added to the mixture as it was agitated. The mixture was polymerized, using 0.1 wt part of potassium persulfate as the initiator at 10° C. under nitrogen environment and an emulsion of phenothiazine was added thereto for termination of polymerization when the final polymerization rate reached 80%. After unreacted monomers were removed under reduced pressure, a low-temperature stabilizer, a polyoxyalkylene alkyl ether, was added in an amount of 0.3 part with respect to 100 parts of the solid matter, as the mixture was agitated. Further, water was removed by vaporization under reduced pressure and the mixture was concentrated to a solid matter concentration of 55 mass %, to give a polychloroprene latex F (gel content: 15%, Mn of toluene soluble fraction: 250,000, molecular weight distribution (Mw/Mn): 2.5).

(7) Preparation of Polychloroprene Latex G 100 parts of pure water, 5 parts of rosin acid sodium, 0.5 part of potassium hydroxide, 0.3 part of formaldehyde naphthalenesulfonic acid condensate sodium salt, and 0.3 part of sodium hydrogen sulfite were placed in a reactor having a capacity of 3 liters under nitrogen stream. After solubilization, 100 parts of chloroprene monomer and 0.10 part of n-dodecylmercaptan were added to the mixture as it was agitated. The mixture was polymerized, using 0.1 wt part of potassium persulfate as the initiator at 5° C. under nitrogen environment and an emulsion of phenothiazine was added thereto for termination of polymerization when the final polymerization rate reached 80%. After unreacted monomers were removed under reduced pressure, a low-temperature stabilizer, a polyoxyalkylene alkyl ether, was added in an amount of 0.3 part with respect to 100 parts of the solid matter, as the mixture was agitated. Further, water was removed by vaporization under reduced pressure and the mixture was concentrated to a solid matter concentration of 55 mass %, to give a polychloroprene latex G (gel content: 15%, Mn of toluene soluble fraction: 300,000, molecular weight distribution (Mw/Mn): 2.0).

(8) Preparation of Polychloroprene Latex H 100 parts of pure water, 5 parts of rosin acid sodium, 0.5 part of potassium hydroxide, 0.3 part of formaldehyde naphthalenesulfonic acid condensate sodium salt, and 0.3 part of sodium hydrogen sulfite were placed in a reactor having a capacity of 3 liters under nitrogen stream. After solubilization, 100 parts of chloroprene monomer and 0.08 part of n-dodecylmercaptan were added to the mixture as it was agitated. The mixture was polymerized, using 0.1 wt part of potassium persulfate as the initiator at 10° C. under nitrogen environment and an emulsion of phenothiazine was added thereto for termination of polymerization when the final polymerization rate reached 80%. After unreacted monomers were removed under reduced pressure, a low-temperature stabilizer, a polyoxyalkylene alkyl ether, was added in an amount of 0.3 part with respect to 100 parts of the solid matter, as the mixture was agitated. Further, water was removed by vaporization under reduced pressure and the mixture was concentrated to a solid matter concentration of 55 mass %, to give a polychloroprene latex H (gel content: 15%, Mn of toluene soluble fraction: 300,000, molecular weight distribution (Mw/Mn): 4.0).

The gel content of these polychloroprene latexes A, B, C, D, E, F, G, and H and the number-average molecular weight (Mn) and the molecular weight distribution (Mw/Mn) of the toluene soluble fraction (sol) therein were those determined by the following methods.

[Gel Content]

Each sample was freeze-dried and then weighed accurately (X g). It was dissolved in toluene (0.6%) and the toluene solution was centrifuged in a centrifugal separator and the gel fraction therein was separated using a 200-mesh wire mesh. The gel fraction separated was air dried and additionally dried under an atmosphere at 110° C. for 1 hour and the mass was weighed accurately (Y g). The gel fraction content was calculated according to the following Formula (1):

Gel fraction content=(Y/X)×100 (1)

[Number-Average Molecular Weight (Mn) and Molecular Weight Distribution (Mw/Mn) of Toluene Soluble Fraction (Sol)]

The toluene soluble fraction was subjected to GPC measurement under the following condition, to give its molecular weight as polystyrene and the weight-average molecular weight (Mw), the number-average molecular weight (Mn), and the molecular weight distribution (Mw/Mn) thereof were evaluated. Measurement was carried out using 0.1% tetrahydrofuran (THF) solution of the toluene soluble fraction (sol) separated during gel fraction content measurement.

Analyzer: HLC-8120GPC produced by Toso Corp.
Analytical column: TSK-GEL GMHHR-H (5 μm) produced by Toso Corp.×3, size: 7.8 mmφ×300 mm
Guard column: Guard column TSK-Guard column TSK-Guard column
HHR-H (5 μm), size: 6 mmφ×40 mm
Column temperature: 40° C.
Solvent: analytical grade THF, Flow rate: 1 mL/min

[Preparation of Acrylic Polymer Latex]

(1) Preparation of Acrylic Polymer Latex I 80 parts of n-butyl acrylate, 20 parts of methyl methacrylate, 0.3 part of ethylene glycol dimethacrylate, 0.1 part of methacrylic acid, 3 parts of sodium dodecylbenzenesulfonate, and 100 parts of water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 6.5 with 10% aqueous potassium carbonate solution, to give an acrylic polymer latex I having a solid matter content of 25% (glass transition point (hereinafter, also referred to as "Tg")=−30° C.).

(2) Preparation of Acrylic Polymer Latex II 100 parts of n-butyl acrylate, 0.3 part of ethylene glycol dimethacrylate, 0.1 part of methacrylic acid, 3 parts of sodium dodecylbenzenesulfonate, and 100 parts of water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 6.5 with 10% aqueous potassium carbonate solution, to give an acrylic polymer latex II having a solid matter content of 35% (Tg=−52° C.).

(3) Preparation of Acrylic Polymer Latex III 60 parts of n-butyl acrylate, 40 parts of methyl methacrylate, 0.3 part of ethylene glycol dimethacrylate, 0.1 part of methacrylic acid, 3 parts of sodium dodecylbenzenesulfonate, and 100 parts of water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 6.5 with 10% aqueous potassium carbonate solution, to give an acrylic polymer latex III having a solid matter content of 35% (Tg=−9° C.).

(4) Preparation of Acrylic Polymer Latex IV 80 parts of n-butyl acrylate, 20 parts of methyl methacrylate, 0.3 part of ethylene glycol dimethacrylate, 0.1 part of methacrylic acid, 1.5 parts of sodium dodecylbenzenesulfonate, and 100 parts of water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 8 with 10% aqueous potassium carbonate solution, to give an acrylic polymer latex IV having a solid matter content of 50% (Tg=−30° C.).

(5) Preparation of Acrylic Polymer Latex V 80 parts of n-butyl acrylate, 20 parts of methyl methacrylate, 0.3 part of ethylene glycol dimethacrylate, 0.1 part of methacrylic acid, 5 parts of sodium dodecylbenzenesulfonate, and 100 parts of water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 6.5 with 10% aqueous potassium carbonate solution, to give an acrylic polymer latex V having a solid matter content of 35% (Tg=−30° C.).

(6) Preparation of Acrylic Polymer Latex VI 90 parts of n-butyl acrylate, 10 parts of methyl methacrylate, 0.3 part of ethylene glycol dimethacrylate, 0.1 part of methacrylic acid, 4 parts of sodium alkyl diphenyl ether disulfonate ("PELEX SS-H" manufactured by Kao Corp. The same shall applied hereinafter), and 100 parts of water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 6.5 with 10% aqueous potassium carbonate solution, to give an acrylic polymer latex VI having a solid matter content of 35% (Tg=−44° C.).

(7) Preparation of Acrylic Polymer Latex VII 70 parts of n-butyl acrylate, 30 parts of methyl methacrylate, 0.3 part of ethylene glycol dimethacrylate, 0.1 part of methacrylic acid, 4 parts of sodium alkyl diphenyl ether disulfonate ("PELEX SS-H", manufactured by Kao Corp. The same shall apply hereinafter), and 100 parts of water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 6.5 with 10% aqueous potassium carbonate solution, to give an acrylic polymer latex VII having a solid matter content of 35% (Tg=−21° C.).

(8) Preparation of Acrylic Polymer Latex VIII 96 parts of n-butyl acrylate, 2 parts of ethylene glycol dimethacrylate, 2 parts of methacrylic acid, 8 parts of semi-hardened beef fatty acid potassium soap ("KS soap" manufactured by Kao Corp.), and 100 parts water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 8.5 with 10% aqueous potassium hydroxide solution, to give an acrylic polymer latex VIII having a solid matter content of 45% (Tg=−52° C.).

(9) Preparation of acrylic polymer latex IX 96 parts of n-butyl acrylate, 2 parts of ethylene glycol dimethacrylate, 2 parts of methacrylic acid, 6 parts of dipotassium alkenylsuccinate ("LATEMUL ASK" manufactured by Kao Corp.), and 100 parts of water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 10.0 with 10% aqueous potassium hydroxide solution, to give an acrylic polymer latex IX having a solid matter content of 45% (Tg=−52° C.).

(10) Preparation of Acrylic Polymer Latex X 96 parts of 2-ethylhexyl acrylate, 2 parts of ethylene glycol dimethacrylate, 6 parts of methacrylic acid, 6 parts of dipotassium alkenylsuccinate ("LATEMUL ASK" manufactured by Kao Corp.), and 100 parts of water were placed in a temperature-adjustable container equipped with a stirrer; 0.2 part of ammonium persulfate was additionally added thereto, and the mixture was allowed to polymerize at 80° C. for 6 hours. The polymerization conversion rate was approximately 99%. The mixture was neutralized to pH 6.50 with 10% aqueous potassium hydroxide solution, to give an acrylic polymer latex X having a solid matter content of 35% (Tg=−70° C.).

The pH, viscosity, solid matter concentration, and glass transition point (Tg) of the acrylic polymer latexes I to X prepared above were determined by the following methods.

[pH]

The pH of a chloroprene-based polymer latex and an adhesive composition was determined, by using an F-22-type pH meter produced by Horiba, Ltd., after the temperature of the chloroprene-based polymer latex was adjusted to 20° C.

[Viscosity]

The viscosity η30 thereof was determined, using a type B viscometer (RB-L80 viscometer: produced by Toki Sangyo Co., Ltd.) under a condition of No. 1 rotor, 60 seconds, and 25° C. at a rotational frequency of 30 rpm.

[Solid Matter Concentration]

Determined were the mass of an aluminum dish (α), the mass of the aluminum dish carrying 2 ml of a polychloroprene latex sample (ß) and the mass of the aluminum dish carrying a latex sample that was obtained after drying at 110° C. for 3 hours (γ). The solid matter concentration was calculated according to the following Formula (2):

$$\text{Solid matter concentration(mass \%)} = \{(\gamma-\alpha)/(\beta-\alpha)\} \times 100 \quad (2)$$

[Glass Transition Point (Tg)]

The glass transition point is a value (glass transition temperature) that is observed as a fluctuation of the base line determined by using a differential scanning calorimeter (DSC) (EXSTAR6000 DSC6200R, Seico Instrumenta Inc.) The glass transition point was determined, by conducting differential thermal analysis under the condition of the sample being left at 23° C. for 30 minutes, cooled at a rate of −10° C./min to a temperature of −100° C., left at the same temperature for 10 minutes, and heated from −100° C. to 100° C. at a heating rate of 20° C./min. Measurement conditions other than the heating rate were the same as those specified in JIS K7121.

Measurement results are summarized in the following Table 1.

TABLE 1

| Acrylic polymer latex | | I | II | III | IV | V | VI | VII | VIII | IX | X |
|---|---|---|---|---|---|---|---|---|---|---|---|
| pH | | 6.5 | 6.5 | 6.5 | 8.0 | 6.5 | 6.5 | 6.5 | 8.5 | 10.0 | 6.5 |
| Viscosity | [mP · S] | 12 | 12 | 11 | 76 | 11 | 12 | 12 | 104 | 73 | 12 |
| Solid matter concentration | [mass %] | 35.0 | 35.0 | 35.0 | 50.0 | 35.0 | 35.0 | 35.0 | 45.0 | 45.0 | 35.0 |
| Tg | [° C.] | −30 | −52 | −9 | −30 | −30 | −44 | −21 | −52 | −52 | −70 |

[pH Regulator]

The pH regulators a to h added to the aqueous adhesive compositions in Examples and Comparative Examples were as follows:
a. Glycine (isoelectric point: 5.97)
b. Alanine (isoelectric point: 6.00)
c. Threonine (isoelectric point: 6.16)
d. 5% Aqueous boric acid solution (prepared by dissolving 5 g of boric acid (powder) in 95 g of pure water)
e. 2% Aqueous ammonium sulfate solution (prepared by dissolving 2 g of ammonium sulfate in 98 g of pure water)
f. Proline (isoelectric point: 6.30)
g. Phenylalanine (isoelectric point: 5.48), Histidine (isoelectric point: 7.59)
h. Histidine (isoelectric point: 7.59)

[Preparation of One-Pack Type Aqueous Adhesive]

A chloroprene-based polymer latex A to H and an acrylic polymer latex I to X were blended at a blending rate (as solid matter) shown in Tables 2 and 3 and a pH regulator a to g was added thereto at a blending amount shown in Tables 2 and 3, to give a one-pack type aqueous adhesive of Examples 1 to 23 and Comparative Examples 1 to 10.

The initial adhesive strength, spray coating characteristics, storage stability, adhesive layer texture, and durometer hardness of the one-pack type aqueous adhesives of Examples 1 to 23 and Comparative Examples 1 to 10 thus obtained were determined by the following methods and the measurement results are summarized in Tables 2 and 3.

[Initial Adhesive Strength]

A one-pack type aqueous adhesive was spray-coated at a rate of 70 g/m$^2$ under an atmosphere at 23° C., as a polyurethane foam having a density of 30 kg/m$^3$ (20 mm thickness×50 mm length×50 mm width) was used as the adherend. After application, the coated foam was left under an atmosphere at 23° C. for 10 seconds or 1 minute; two of the polyurethane foams were layered with the adhesion faces facing each other, while the one-pack type aqueous adhesive was still undried; and the composite was compressed from a thickness of 40 mm to 10 mm and left in that state for 5 seconds. Immediately then, the composite was subjected to a tensile test in a tensile tester (Autograph produced by Shimadzu Corp.: tensile rate 200 mm/min) for determination of the initial adhesive strength (N/cm$^2$) in the direction vertical to the adhesion face. A composite having an initial adhesive strength of 2.0 N/cm$^2$ was considered satisfactory in the case of drying for 10 seconds, and a composite having an initial adhesive strength of 3.0 N/cm$^2$ was regarded satisfactory in the case of drying for 1 minute.

[Spray Coating Characteristics]

Coating state of the adhesive and the state of spray gun were examined by visual observation when the samples above for determination of initial adhesive strength were prepared. Those samples that permitted even and uniform coating of the adhesive were indicated by ○ and those samples that gave irregularity and seedings or caused clogging of spray gun were indicated by x.

[Storage Stability]

250 g of a one-pack type aqueous adhesive was heat-treated at 40° C. for 7 days and it was examined whether there was increase in viscosity. Those one-pack type aqueous adhesives having consistent viscosity and generating no aggregates or coagulums were indicated by ○ and those that showed increase in viscosity and caused solidification or gave coagulums were indicated by x.

[Texture of Adhesive Layer]

In a similar manner to the evaluation method for initial adhesive strength, a one-pack type aqueous adhesive was spray-coated at a rate of 70 g/m$^2$ under an atmosphere at 23° C., as a polyurethane foam having a density of 30 kg/m$^3$ (20 mm thickness×50 mm length×50 mm width) was used as the adherend. After application, the composite was left under an atmosphere at 23° C. for 10 seconds; two of the polyurethane foams were layered with the adhesion faces facing each other, while the one-pack type aqueous adhesive was still undried and the composite was compressed from a thickness of 40 mm to 10 mm and left in that state for 5 seconds. The composite was then left at 23° C. for 24 hours and the texture of the adhesive layer was evaluated sensually with a finger. Those composites wherein the textures of the polyurethane foam and the adhesive layer were identical were indicated by ○ and those wherein the texture of the adhesive layer was harder than the texture of the polyurethane foam were indicated by x.

[Durometer Hardness]

A box-shaped sample (15 cm length×10 cm width×1 cm height) was prepared using a PTFE film of FLON INDUSTRY and a one-pack type adhesive was applied thereon dropwise. The amount of the adhesive applied dropwise was calculated from the solid matter content and the specific density of one-pack type adhesive, so that it gave a film thickness of 0.2 cm after drying. The latex mixture applied dropwise was dried under an atmosphere at 23° C. for 1 week, to give a dry film. Those samples dried unfavorably then were dried additionally in a vacuum dryer for several days after the drying above for one week. The dry films thus obtained were layered to a thickness of 1 cm and the durometer hardness (type A), as specified in JIS K 6253-3, thereof was determined, using ASKER Durometer (type A, produced by Kobunshi Keiki Co., Ltd.) Those dry films having a durometer hardness of 75 or less were considered satisfactory.

TABLE 2

| | | Example | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| Composition | Chloroprene-based polymer latex | | | | | | | | | | | | | | | | | |
| | Kind | A | B | C | D | E | F | G | H | F | F | F | F | F | F | F | F | F |
| | Blending rate (mass %) | 75 | 75 | 75 | 75 | 75 | 75 | 75 | 75 | 50 | 85 | 75 | 75 | 75 | 75 | 75 | 75 | 75 |
| | Acrylic polymer latex | | | | | | | | | | | | | | | | | |
| | Kind | I | I | I | I | I | I | I | I | I | I | II | III | IV | V | VI | VII | I |
| | Blending rate (mass %) | 25 | 25 | 25 | 25 | 25 | 25 | 25 | 25 | 50 | 15 | 25 | 25 | 25 | 25 | 25 | 25 | 25 |
| | Total latex blending amount (parts by mass) | 100 | 100 | 100 | 100 | 100 | 100 | 100 | 100 | 100 | 100 | 100 | 100 | 100 | 100 | 100 | 100 | 100 |
| | pH adjuster | | | | | | | | | | | | | | | | | |
| | Kind | a | a | a | a | a | a | a | a | a | a | a | a | a | a | a | a | b |
| | Blending amount (parts by mass) | 11 | 11 | 11 | 11 | 11 | 11 | 11 | 11 | 11 | 11 | 11 | 11 | 11 | 11 | 11 | 11 | 11 |
| Evaluation of adhesive | Initial adhesive strength (storage period: 10 seconds) | 3.1 | 4.1 | 3.7 | 3.1 | 3.6 | 4.1 | 3.5 | 4.0 | 2.0 | 4.5 | 2.8 | 3.2 | 3.6 | 2.0 | 3.0 | 3.0 | 3.7 |
| | Initial adhesive strength (storage period: 1 minute) | 4.4 | 4.3 | 4.5 | 4.0 | 4.5 | 4.6 | 4.5 | 4.1 | 3.0 | 5.2 | 3.6 | 4.1 | 4.1 | 3.1 | 3.4 | 3.6 | 4.7 |
| | Spray coating characteristics | ○ | ○ | ○ | ○ | ○ | ○ | ○ | ○ | ○ | ○ | ○ | ○ | ○ | ○ | ○ | ○ | ○ |
| | Storage stability (40° C. × 1 W) | ○ | ○ | ○ | ○ | ○ | ○ | ○ | ○ | ○ | ○ | ○ | ○ | ○ | ○ | ○ | ○ | ○ |
| | Texture of adhesive layer | ○ | ○ | ○ | ○ | ○ | ○ | ○ | ○ | ○ | ○ | ○ | ○ | ○ | ○ | ○ | ○ | ○ |
| | Durometer hardness | 67 | 64 | 68 | 64 | 65 | 66 | 66 | 67 | 32 | 71 | 54 | 75 | 69 | 61 | 59 | 71 | 64 |

TABLE 3

| | | Example | | | | | | Comparative Example | |
|---|---|---|---|---|---|---|---|---|---|
| | | 18 | 19 | 20 | 21 | 22 | 23 | 1 | 2 |
| Composition | Chloroprene-based polymer latex | | | | | | | | |
| | Kind | F | F | F | F | F | F | F | F |
| | Blending rate (mass %) | 75 | 75 | 75 | 75 | 75 | 75 | 35 | 90 |

TABLE 3-continued

|  |  |  |  |  |  |  |  |  |  |
|---|---|---|---|---|---|---|---|---|---|
|  | Acrylic polymer latex |  |  |  |  |  |  |  |  |
|  | Kind | I | I | I | I | I | I | I | I |
|  | Blending rate (mass %) | 25 | 25 | 25 | 25 | 25 | 25 | 65 | 10 |
|  | Total latex blending amount (parts by mass) | 100 | 100 | 100 | 100 | 100 | 100 | 100 | 100 |
|  | pH adjuster |  |  |  |  |  |  |  |  |
|  | Kind | c | d | e | f | a | a | a | a |
|  | Blending amount (parts by mass) | 11 | 3 | 3 | 11 | 13 | 3 | 9 | 9 |
| Evaluation of adhesive | Initial adhesive strength (storage period: 10 seconds) | 3.8 | 2.4 | 2.3 | 4.0 | 3.7 | 2.1 | 1 | 4.9 |
|  | Initial adhesive strength (storage period: 1 minute) | 4.5 | 3.1 | 3 | 4.4 | 4.4 | 3.1 | 1.8 | 5.3 |
|  | Spray coating characteristics | ○ | ○ | ○ | ○ | ○ | ○ | ○ | ○ |
|  | Storage stability (40° C. × 1 W) | ○ | ○ | ○ | ○ | ○ | ○ | ○ | ○ |
|  | Texture of adhesive layer | ○ | ○ | ○ | ○ | ○ | ○ | ○ | x |
|  | Durometer hardness | 65 | 64 | 66 | 65 | 64 | 63 | 22 | 85 |

|  |  | Comparative Example |  |  |  |  |  |  |  |
|---|---|---|---|---|---|---|---|---|---|
|  |  | 3 | 4 | 5 | 6 | 7 | 8 | 9 | 10 |
| Composition | Chloroprene-based polymer latex |  |  |  |  |  |  |  |  |
|  | Kind | F | F | F | F | F | F | F | F |
|  | Blending rate (mass %) | 75 | 75 | 75 | 75 | 75 | 75 | 75 | 75 |
|  | Acrylic polymer latex |  |  |  |  |  |  |  |  |
|  | Kind | I | I | I | VIII | IX | X | I | I |
|  | Blending rate (mass %) | 25 | 25 | 25 | 25 | 25 | 25 | 25 | 25 |
|  | Total latex blending amount (parts by mass) | 100 | 100 | 100 | 100 | 100 | 100 | 100 | 100 |
|  | pH adjuster |  |  |  |  |  |  |  |  |
|  | Kind | a | a | d | a | a | a | g | h |
|  | Blending amount (parts by mass) | 1 | 15 | 15 | 9 | 9 | 9 | 9 | 9 |

TABLE 3-continued

| Evaluation of adhesive | Initial adhesive strength (storage period: 10 seconds) | 0.7 | 5 | 2.2 | 0.4 | 1.2 | 1.2 | Evaluation not possible |
|---|---|---|---|---|---|---|---|---|
| | Initial adhesive strength (storage period: 1 minute) | 1.1 | 5.1 | 3.1 | 2.1 | 2.1 | 1.7 | |
| | Spray coating characteristics | ○ | x | ○ | ○ | ○ | ○ | |
| | Storage stability (40° C. × 1 W) | ○ | x | x | ○ | ○ | ○ | |
| | Texture of adhesive layer | ○ | ○ | ○ | ○ | ○ | ○ | |
| | Durometer hardness | 64 | 67 | 67 | 66 | 67 | 40 | |

As shown in Tables 2 and 3, the one-pack type aqueous adhesives of Examples 1 to 23 were superior both in initial adhesive strength and storage stability and gave a soft texture of adhesive layer and a durometer hardness of 75 or less.

Meanwhile, the one-pack type aqueous adhesive of Comparative Example 1, wherein the blending rate of chloroprene-based polymer latex (A) was less than 50 mass % and the blending rate of acrylic polymer latex (B) more than 50 mass %, the one-pack type aqueous adhesive of Comparative Example 3, wherein the blending amount of pH adjuster (C) was less than 3 parts by mass, and the one-pack type aqueous adhesives of Comparative Examples 6 to 8, which did not contain a sodium alkylbenzenesulfonate having a structure represented by the Chemical Formula (1), were lower in initial adhesive strength than those of Examples 1 to 23. In addition, the one-pack type aqueous adhesive of Comparative Example 2, wherein the blending rate of chloroprene-based polymer latex (A) was more than 85 mass % and the blending rate of acrylic polymer latex (B) less than 15 mass %, had a texture of adhesive layer harder than that of the polyurethane foam and also gave a higher durometer hardness. The one-pack type aqueous adhesives of Comparative Examples 4 and 5, wherein the blinding amount of pH adjuster (C) was more than 13 parts by mass, were lower in storage stability and the one-pack type aqueous adhesive of Comparative Example 4 was also lower in spray coating characteristics. In the cases of the one-pack type aqueous adhesive of Comparative Example 9, which was prepared by using phenylalanine having an isoelectric point of 5.48 and histidine having an isoelectric point of 7.59, and that of Comparative Example 10, which was prepared by using histidine having an isoelectric point of 7.59, aggregates were generated and solidification phenomenon was observed in preparation of the one-pack type aqueous adhesives, thus prohibiting evaluation.

When the chloroprene-based polymer latexes of Examples are considered, the chloroprene-based polymer latex of Example 6 was superior in initial adhesive strength to the chloroprene-based polymer latexes of Examples 1 and 4, wherein the gel content (toluene insoluble fraction) in the chloroprene-based polymer constituting the chloroprene-based polymer latex is not in the range of 5 to 30 mass %, and the chloroprene-based polymer latex of Example 5, wherein the number-average molecular weight of the toluene soluble fraction in the chloroprene-based polymer was not in the range of 200,000 to 500,000. The result indicates that the chloroprene-based polymer latex, wherein the gel content (toluene insoluble fraction) in the chloroprene-based polymer constituting the chloroprene-based polymer latex is 5 to 30 mass % and the number-average molecular weight of the toluene soluble fraction in the chloroprene-based polymer is in the range of 200,000 to 500,000, is preferable.

When the difference in the kind of pH adjuster is considered, the chloroprene-based polymer latex of Example 6, which employed glycine, was superior in initial adhesive strength to that of Example 17 employing alanine, that of Example 18 employing threonine and that of Example 21 employing proline.

The invention claimed is:

1. A latex composition, comprising
a chloroprene-based polymer latex (A) containing a chloroprene-based polymer in an amount of 50 to 85 mass % as solid matter and
an acrylic polymer latex (B) having a glass transition temperature of −52 to −9° C. and containing an acrylic polymer containing a sodium alkylbenzenesulfonate having a structure represented by the following chemical formula (1) or a sodium alkyl diphenyl ether disulfonate in an amount of 15 to 50 mass % as solid matter, in a total amount of 100 parts by mass, and additionally
at least one pH regulator (C) selected from boric acid, ammonium sulfate, and amino acids having an isoelectric point of 5.5 to 6.5 in an amount of 3 to 13 parts by mass as solid matter:

[Formula 1]

(1)

wherein, R represents an aliphatic alkyl group.

2. The latex composition according to claim 1, wherein the sodium alkylbenzenesulfonate having a structure represented by the chemical formula (1) above is sodium dodecylbenzenesulfonate.

3. The latex composition according to claim 1, wherein the content of the sodium alkylbenzenesulfonate having a structure represented by the chemical formula (1) or the sodium alkyl diphenyl ether disulfonate is 1.5 to 5 parts by mass with respect to 100 parts by mass of the acrylic polymer.

4. The latex composition according to claim 1, wherein the chloroprene-based polymer is a chloroprene homopolymer, a copolymer of chloroprene and 2,3-dichloro-1,3-butadiene, or a mixture of a chloroprene homopolymer and a copolymer of chloroprene and 2,3-dichloro-1,3-butadiene.

5. The latex composition according to claim 1, wherein the chloroprene-based polymer latex (A) has a gel content (toluene insoluble fraction) of 5 to 30 mass % and the toluene soluble fraction has a number-average molecular weight of 200,000 to 500,000 and a molecular weight distribution (Mw/Mn) of 2.0 to 4.0.

6. A one-pack aqueous adhesive, comprising the latex composition according to claim 1.

* * * * *